(12) United States Patent
Graf et al.

(10) Patent No.: US 8,764,546 B2
(45) Date of Patent: Jul. 1, 2014

(54) ELECTRONIC GAMING AND/OR GAMBLING MACHINE

(75) Inventors: Johann F. Graf, Gumpoldskirchen (AT); Eduard Svoboda, Vienna (AT)

(73) Assignee: Novomatic AG, Gumpoldskirchen (AT)

( * ) Notice: Subject to any disclaimer, the term of this patent is extended or adjusted under 35 U.S.C. 154(b) by 243 days.

(21) Appl. No.: 12/523,385

(22) PCT Filed: Oct. 24, 2007

(86) PCT No.: PCT/EP2007/009241
§ 371 (c)(1),
(2), (4) Date: Jul. 16, 2009

(87) PCT Pub. No.: WO2008/086833
PCT Pub. Date: Jul. 24, 2008

(65) Prior Publication Data
US 2010/0048285 A1  Feb. 25, 2010

(30) Foreign Application Priority Data

Jan. 19, 2007  (DE) .......................... 10 2007 002 933

(51) Int. Cl.
*A63F 9/24*  (2006.01)
(52) U.S. Cl.
USPC .................... 463/20; 463/30; 463/35; 463/36
(58) Field of Classification Search
USPC .......................................... 463/20, 30, 36, 35
See application file for complete search history.

(56) References Cited

U.S. PATENT DOCUMENTS

| 4,816,812 A * | 3/1989 | Iida ................................ 345/635 |
| 5,678,217 A * | 10/1997 | Usui et al. .................. 455/277.1 |
| 5,835,088 A * | 11/1998 | Jaaskelainen, Jr. ........... 715/803 |

(Continued)

FOREIGN PATENT DOCUMENTS

| DE | 20000990 | 5/2000 |
| DE | 212004000009 | 8/2005 |

(Continued)

OTHER PUBLICATIONS

German Patent Application No. 10 2007 002 933.2 filed Jan. 19, 2007 in the name of Novomatic AG, Search Report mailed Aug. 31, 2007.

(Continued)

*Primary Examiner* — Pierre E Elisca
(74) *Attorney, Agent, or Firm* — Levine Bagade Han LLP

(57) ABSTRACT

The present invention relates to an electronic gaming and/or gambling machine, in particular to a slot machine which is coin operable or is operable by monetary equivalents, comprising a display apparatus for the display of at least one game and optionally additional information, with the display apparatus having at least a first and a second screen on which at least one screen display, preferably a main game, and one second screen display, preferably a bonus game and/or additional information, can be displayed as well as a control panel for the actuation of the gaming and/or gambling machine. In accordance with the invention, the electronic gaming and/or gambling machine is characterized in that a switching device is provided which is actuable by a machine user by an input device for the switching of the first screen representation from the first screen to the second screen and of the second screen representation from the second screen to the first screen or to a further screen and/or vice versa.

19 Claims, 3 Drawing Sheets

(56) References Cited

U.S. PATENT DOCUMENTS

Figure 1:
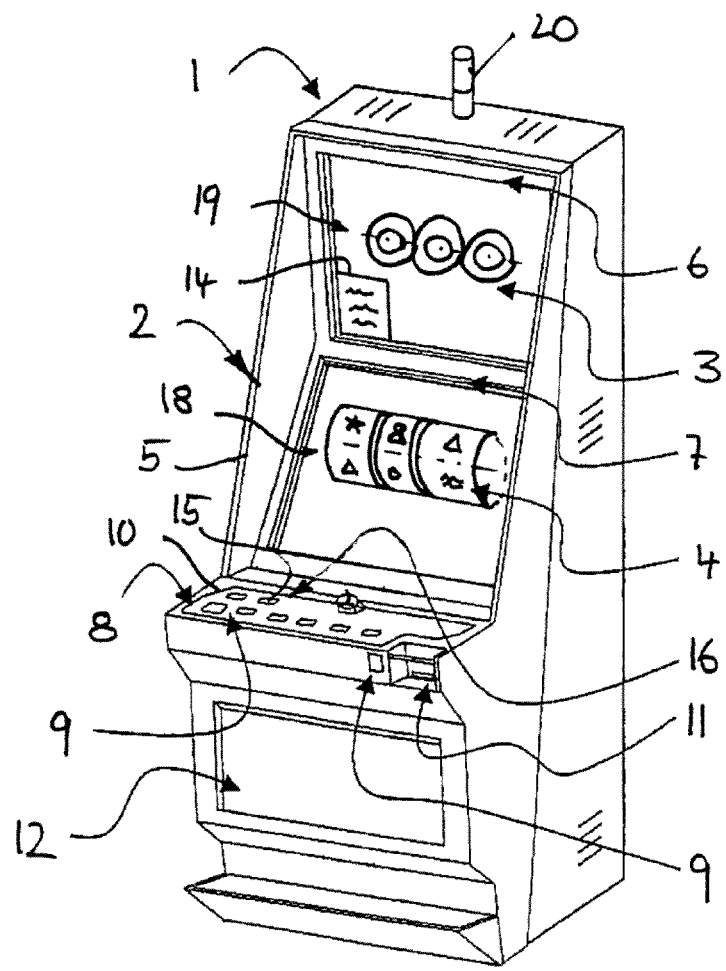

| | | | |
|---|---|---|---|
| 6,709,331 B2* | 3/2004 | Berman | 463/16 |
| 6,860,810 B2* | 3/2005 | Cannon et al. | 463/20 |
| 7,918,738 B2* | 4/2011 | Paulsen | 463/43 |
| 2002/0022512 A1* | 2/2002 | Higurashi | 463/20 |
| 2002/0151360 A1* | 10/2002 | Durham et al. | 463/30 |
| 2004/0014526 A1* | 1/2004 | Kulas | 463/43 |
| 2004/0029636 A1* | 2/2004 | Wells | 463/32 |
| 2004/0137978 A1* | 7/2004 | Cole et al. | 463/16 |
| 2004/0152509 A1* | 8/2004 | Hornik et al. | 463/20 |
| 2004/0166936 A1* | 8/2004 | Rothschild et al. | 463/35 |
| 2004/0166937 A1* | 8/2004 | Rothschild et al. | 463/36 |
| 2005/0020348 A1* | 1/2005 | Thomas et al. | 463/20 |
| 2005/0215311 A1 | 9/2005 | Hornik et al. | |
| 2006/0009286 A1* | 1/2006 | Durham et al. | 463/30 |
| 2006/0025036 A1* | 2/2006 | Boyle et al. | 446/175 |
| 2006/0287042 A1 | 12/2006 | Osawa | |
| 2007/0004513 A1* | 1/2007 | Wells et al. | 463/31 |
| 2007/0032296 A1* | 2/2007 | Nakamurai | 463/30 |
| 2007/0111776 A1* | 5/2007 | Griswold et al. | 463/16 |
| 2008/0113745 A1* | 5/2008 | Williams et al. | 463/20 |
| 2008/0132331 A1* | 6/2008 | Gatto et al. | 463/31 |

FOREIGN PATENT DOCUMENTS

| | | |
|---|---|---|
| JP | 2000-132305 | 5/2000 |
| JP | 2005-218670 | 8/2005 |
| WO | WO 2004/063860 | 7/2004 |
| WO | WO 2005/071629 | 8/2005 |
| WO | WO 2006/122358 | 11/2006 |

OTHER PUBLICATIONS

International Patent Application No. PCT/EP2007/009241 filed Oct. 24, 2007 in the name of Novomatic AG, International Search Report mailed Mar. 26, 2008.

Russian Patent Application No. 2009131465/08 filed Oct. 24, 2007 in the name of Novomatic AG, Office Action.

* cited by examiner

ELECTRONIC GAMING AND/OR GAMBLING MACHINE

The present invention relates to an electronic gaming and/or gambling machine, in particular to a slot machine which is coin operable or is operable by monetary equivalents, comprising a display apparatus for the display of at least one game and optionally additional information, with the display apparatus having at least two screens on which at least one screen representation, preferably a main game, and one second screen representation, preferably a bonus game and/or additional information, can be displayed as well as a control panel for the actuation of the gaming and/or gambling machine.

Slot machines operated by coins or monetary equivalents are frequently made in the form of reel gaming machines, with a plurality of rotating reels having different game symbols conventionally rotating in the view window of the display field, as is shown, for example, in DE 200 00 990 U1 and with winnings being output when the reels having the same game symbols stop along a payline. In this respect, a control panel having a plurality of control buttons is provided beneath the display field, approximately at the level of the stomach of the player, said control buttons being operable by hand and serving, among other things, to set the rotating reels into operation or to stop them.

In more recent times, it has become known to use screens instead of such mechanical, actually rotating reels and to represent the rotating reels graphically on the respective screen. WO 2005/041139, for example, shows such a slot machine having a screen representation of the game to be played in which two screens are provided which have a large area, which are inclined toward one another and on which games to be played with the gaming machine can be displayed. The arrangement of two screens brings along a considerable increase in the appeal of the game and in the degree of entertainment since, for example, two games can be played in parallel with one another or additional information on the game running on the other screen can be displayed on the second screen. In this respect, it is likewise possible to display information not relating directly to the ongoing game on the second screen; for example, information relating to additional entertainment options in the respective gambling casino, restaurant menus, news tickers, etc. A more relaxed vision and better visibility of the screen displays can be achieved by the mutually inclined arrangement of the screens since the direction of gaze toward the screens is less oblique than with non-inclined screen arrangements.

Nevertheless, vision impairments, for example by light reflections caused by ceiling lamps or the like, can also occur with such machines. In addition, depending on a person's height, it is, for example, possible that a game which interests the player more is displayed on a screen which is more difficult for him to see, whereby the player may become fatigued, which can bring about a reduction in the appeal of the game and in concentration. In addition, with slot machines having large screens which are arranged above one another, the plurality of games ongoing at the same time are not able to be followed equally ideally in the player position predetermined by the control panel.

Starting from this, it is the underlying object of the invention to provide an improved electronic gaming and/or gambling machine, in particular a slot machine, which avoids disadvantages of the prior art and further develops the latter in an advantageous manner. In particular, the ability to follow the games shown on the screens should be improved in an ergonomically favorable player position, the appeal of the game of the machine should be increased and a fatigue-free individually more comfortable use of the gaming machine should be made possible.

This object is solved in accordance with the invention by a gaming and/or gambling machine in accordance with claim 1. Preferred embodiments of the invention are the subject of the dependent claims.

It is therefore proposed to make the machine variable with respect to the screen representations on the plurality of screens so that a player or machine user can change the screen representations on the at least two screens of the machine according to taste. In accordance with the invention, a switching device which can be actuated by a machine user by an input device is provided for the switching of the initially named first screen representation from the first screen to the second screen and of the second screen representation from the second screen to the first screen or to a further screen and/or vice versa. The plurality of screens form flip screens which enable the machine user to switch the screen representations to and fro between the screens and to swap the screen representations on the screens between one another. If, for example, a game of more interest for the respective machine user is running on a screen which is more difficult for him to view personally, he can activate the named switching device via the input device so that the named game is switched to another screen which is easier for him to see, whereas the game provided there per se or the information representation provided there is switched to the in turn other screen. The switchable screen representation in this respect does not necessarily have to be a representation of the game offered by the machine, but can rather also comprise the representation of additional information. If, for example, a player wants to read this additional information more accurately, the corresponding screen view can temporarily be placed onto the screen better visible for him or for her.

In a further development of the invention, the gaming or gambling machine can also have more than two screens, with the screen representations advantageously being able to be switched to and fro between the then three or more screens by means of the switching device. The switching of the screen representations can in this respect generally take place in different manners. For example, a so-to-say, ring-like switching on of the screen representations can be effected such that the screen representation of the first screen is switched to the second screen, the screen representation of the second screen is switched to the third screen, the screen representation of the third screen is switched to an nth screen and finally the screen representation of the nth screen is switched to the first screen. Alternatively or additionally, however, a switchability of the screen representations differing herefrom can also be realized; for example, a pairwise switching to and fro of the screen representations, for example between a first screen and a fourth screen and between a second screen and a third screen. Furthermore, further switching devices can also be provided, optionally also while not taking account of all of the several screens, for example to the effect that the screen representation of the first screen is switched to a third screen, the screen representation of a second screen is switched to the first screen and the screen representation of the third screen is switched to the second screen, whereas the screen representation on a fourth screen remains unchanged.

In this respect, in an advantageous further development of the invention, the switching device is made such that the screen representations during an ongoing game and its representation can be switched to and fro between the screens. The appeal of the game of the gaming machine can hereby be considerably increased. A game can in particular be switched to a screen preferred by the player, e.g. onto a central screen, by a switching device made in this manner during its exciting phases, whereas the game is placed onto a different, perhaps less preferred screen in its less exciting game phases. In this respect, another game, which is perhaps just in its exciting phase, can alternately in turn be switched to the main screen. A player can hereby always switch the respective most exciting game to the screen preferred by him, whereas other games continue on other, less preferred screens.

The switching device is in this respect advantageously made to work without interruption so that a game continues without interruption irrespective of a switching of its screen representation. Without interrupting the course of the game, the representation of a game is first displayed on the one screen and, after actuation of the switching device is then represented on the other screen and continued there.

In an advantageous further development of the invention, the switching to and fro of the screen representations from the one screen to another screen and vice versa can also take place automatically. A switching control provided for this purposes actuates the switching device automatically in dependence on a predetermined operating condition of the gaming and/or gambling machine.

The automatic switching of the screen representations between the different screens can in this respect take place in dependence on different operating conditions. In accordance with a simple embodiment of the invention, the switching of the screen representations can, for example take place with time control, for example to the extent that the screen representation is switched automatically after the end of a predetermined time period, for example beginning with the start of a game.

An embodiment of the switch control is, however, preferred which causes the automatic switching of the screen representations from the one screen to the other screen in dependence on the course of the game and/or on the occurrence of a characteristic game situation and/or game condition of a game represented on one of the screens, in particular on the occurrence of a predetermined game situation and/or game condition which can be characterized by a specific game control signal. For example, the automatic screen control can react to an input request output by the game, in particular when it is shown on a screen less easy to see and less easy to reach for the player and/or less preferred. If, for example, on a touch screen machine, an input request is output on a screen less easy to reach for the player, the switch control can automatically switch this screen representation to the screen which can be reached more easily by the player so that the player can reach the corresponding touch screen field in an ergonomically more favorable manner. Alternatively or additionally, an automatic screen switching can also takes place with other game situations such as on the occurrence of an end phase of a game, for example to the extent that a game entering the end phase is switched to the main screen of the gaming machine. Alternatively or additionally, the automatic screen switching can also take place temporarily, for example when a game placed onto a screen which is more difficult to see is just entering into its exciting phase; for example when a reel game is approaching the stopping of the reels in time within a predetermined time window.

The manual actuation of the actuation device can generally take place differently. In a further development of the invention, the input apparatus provided for this purpose can have an actuation button for the actuation of the switching device by pressing a button, touching a button and/or approaching a button. A mechanical push button and/or a graphical touch screen button can in particular be used in this respect. The actuation button is in this respect advantageously arranged in the control panel of the gaming or gambling machine and is provided for hand actuation. Alternatively or additionally, the actuation button can, however, also be made as a foot pedal, a knee pedal or as a pedal to be actuated by another part of the body, said pedal being able to be arranged directly at the housing of the gaming and/or gambling machine or being able to be provided spaced apart herefrom in the manner of a remote control module.

Alternatively or additionally to an actuation button acting in a tactile manner, the input apparatus can also be made to work in a non-contact manner; it can preferably have a movement sensor for the sensing of a movement of a part of the body, in particular a hand movement, for the actuation of the switching apparatus by a hand movement. A movement sensor can in particular be provided in the form of a light barrier which already senses the approaching of a hand to the input apparatus and triggers the switching. A tilting movement of the back of the hand in manner of turning a page can, for example, be sensed by a suitable movement sensor. Other input sensors working in a non-contact manner are naturally likewise possible.

Alternatively or additionally, an acoustic input means can also be provided for the actuation of the switching apparatus by voice and/or sound, said input means, for example, being able to recognize a whistle or a handclap and being able to trigger the switching of the screen representation between the screens in the aforesaid manner on the detection of the corresponding sound or of the corresponding sound sequence.

In a further development of the invention, the input apparatus has different actuation modes for the actuation of the switching device in different switching directions and/or in different switching modes. The input apparatus can in particular be actuated in different manners to trigger different switching procedures. In accordance with an advantageous embodiment of the invention, provision can be made that, on a simple actuation of the input apparatus, the screen representations are switched on in a predetermined direction; for example, the screen representation initially shown on a first screen to a second screen; the screen representation initially shown on the second screen to the third screen, etc. If, in contrast, the input apparatus is actuated multiple times, in particular in the manner of a double click of a computer mouse, a switching of the screen representations can take place in a second direction opposite to the first and/or a preset association of the screen representations with the different screens can be restored, for example to the effect that, independently of the previously carried out switching procedures, a main game is again switched to a main screen and a secondary game and/or additional information is again switched to an additional screen.

Alternatively or additionally to a multiple actuation of the same input means such as the named double click, different switching procedures can also be triggered by actuation of different input means. Provision can in particular be made in an advantageous further development of the invention that a first switching procedure is triggered by actuation of a first input means and a second switching procedure is triggered by actuation of a second input means, with it in turn being able to be particularly advantageous to trigger the second switching procedure by a joint actuation of the first and second input means. When the input means is made in the form of actuation keys, provision can in particular be made that a first switching procedure is triggered by a simple pressing of the switching button, whereas a second switching procedure, for example a reverse switching of the screen representations, can be triggered by pressing a button combination, preferably by simultaneous pressing of the switching button together with a further control button.

Alternatively or additionally to such a simple actuation and multiple actuation, the actuation device itself can also have a plurality of actuation devices, for example in the manner of a joystick which can be tilted to the front and to the rear to be able to switch the screen representations in a forward direction from a first screen to a second screen, etc. as well as to the rear to be able to switch from a second screen to a first screen, etc.

In accordance with an advantageous embodiment of the invention, the gaming or gambling machine has an indication apparatus which can be controlled by the switching device, which is preferably made as acoustic and by means of which a switching of the screen representations in the aforesaid manner is indicated acoustically and can thus be detected by a machine user not only by detection of the changing screen representations itself, but additionally also by the additionally output indication signal, for example, also when the machine user is not actually observing the screens. The output of an acoustic indication signal is preferred in this respect. Alternatively or additionally, however, differently made indication signals can be used; for example, a vibration alarm which is output on the switching of the screen representations can be sent to a game control button usually occupied by the player.

In a further development of the invention, the indication apparatus in this respect outputs different indication signals for different switching procedures so that the respective switching procedures can be individually recognized with reference to the output indication signal. If, for example, an acoustic indication signal is output in the aforesaid manner, an indication signal varying differently in pitch in dependence on the switching procedure can be output. For example, on a switching upward of the screen representation of the main game to a screen arranged further upward, a higher tone or an upwardly moving tone sequence can be output which so-to-say acoustically indicates the upward switching, whereas vice versa, on a moving down of the screen representation of the (main) game to the lower screen, a lower tone and/or a downwardly moving tone sequence is output.

The switching device can generally intervene at different points of the machine and screen control and of the associated signal transmission circuits to switch the screen representations to and fro between the screens of the gaming and/or gambling machine in the desired manner. To achieve a particularly fast switching, in accordance with an advantageous embodiment of the invention, the switching device can manipulate the graphic controller or a plurality of graphic controllers by which the screens are controlled. The hardware of the machine for the screen control can so-to-say be manipulated electronically by the corresponding manipulation means associated with the switching device; in particular signal paths and/or memory access addresses fixed in the respective graphic controller can be swapped or swapped cyclically by the switching device, whereby the screen representations are switched to other screens.

Alternatively or additionally, the switching device can also include program control means for the technical software change of the control program executed in a central control unit and/or can include means for the changing of the data or data contents which control the screen display in a technical software manner. The switching device can therefore also effect the switching of the screen representations on a technical software level.

Alternatively or additionally, in accordance with a simpler embodiment of the invention, provision can also be made that the switching device has a signal gate or a switch gate, preferably a switch board, which is arranged in the signal path or signal paths between the aforesaid graphic controller and the screens controlled thereby. The signal paths are swapped between the graphic controller and the screens by switching the signal gate, whereby the respective screen representation is moved to another screen than the screen defined per se by the graphic controller.

The switching of the screen displays can generally cover different regions of the screens. In this respect, in an advantageous further development of the invention, the respective total screen representation, i.e. the total screen representation shown on the area of a screen, is switched from the one screen to the other screen and vice versa.

Alternatively to this, the switching of the screen displays can, however, also only cover a part region of the area of the respective screen. Provision can in particular be made that the first screen display and/or the second screen display is/are switched to only a part of the screen area of the respective screen in the manner of a pop-up window, without the remaining part of the screen area of the respective screen also being covered by the flip-screen procedure. This can in particular be of advantage when, for example, additional information can be called up on one of the screens in the manner of a pop-up window. If the machine user wants to fetch this additional information to a screen preferred by him, the machine user actuates the switching device in a corresponding manner so that the named pop-up window is switched from the one screen to the other screen. It can be advantageous for this purpose if the actuation device can be actuated in different operating modes in the aforesaid manner, with provision being able to be made, for example, that only the respective screen window is switched on to the next screen by double clicking the actuation device and an underlying screen window or a screen window in the background remains on the respective screen and is not switched along, whereas a simple clicking of the actuation device, for example, can effect a switching on of the total screen display.

The invention will be explained in more detail in the following with respect to a preferred embodiment and to associated drawings.

Figure 2:
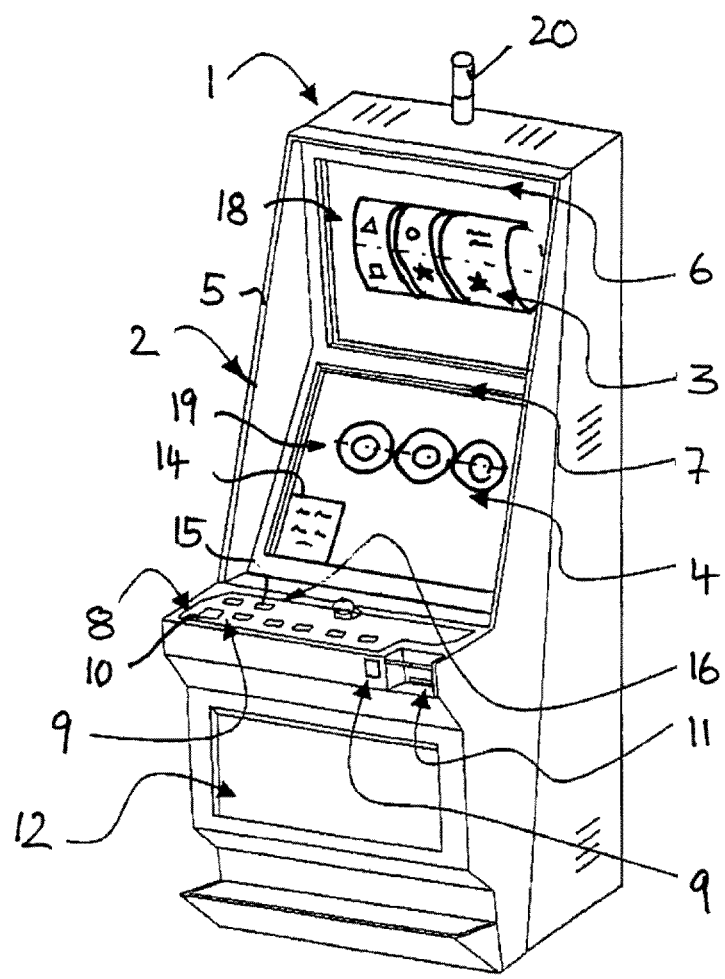
Figure 3:
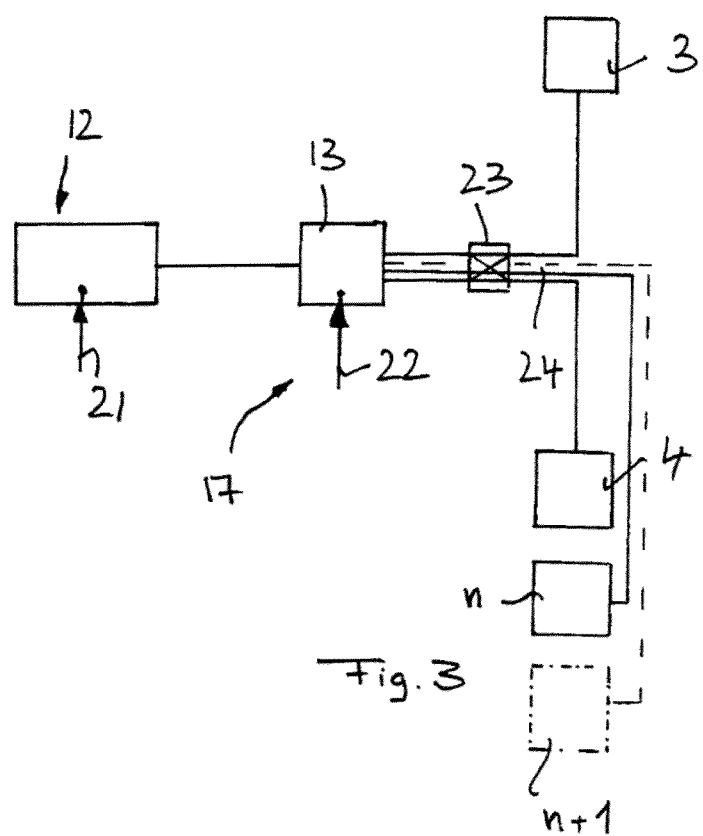

There are shown in the drawings:

FIG. 1: a perspective front view of an electronic slot machine having two screens which are arranged above one another, which are arranged at oblique angles to one another and on which a plurality of games can be displayed simultaneously and/or a game and additional information;

FIG. 2: a perspective front view of the slot machine of FIG. 1, with, in comparison with FIG. 1, the screen representation of the lower screen having been switched to the upper screen and the screen representation of the upper screen having been switched to the lower screen; and FIG. 3: a schematic, simplified representation of the machine and screen control and of the screen device associated therewith for the switching of the screen representations.

The gaming machine shown in FIGS. 1 and 2 forms a standing machine and includes a machine housing 1 which is approximately as tall as a person, which is, roughly speaking, box-shaped and whose upper half serves the mounting of a display apparatus 2 which, in the drawn embodiment, comprises two large-area screens 3 and 4 arranged above one another, with it being understood that more than two screens could also be provided. As FIG. 1 shows, the gaming machine housing 1 has in its front side 5 two cut-outs 6 and 7 which include an oblique angle with one another so that the screens 3 and 4 arranged above one another are tilted with respect to one another, likewise at an oblique angle to one another, about a horizontal axis. In a further development of the invention, the gaming machine can also be made as a slant-top machine.

The gaming machine housing 1 has a control panel section 8 beneath the two screens 3 and 4 which projects towards the player and extends in the drawn embodiment over the total width of the machine housing 1 and is essentially box-shaped. The upper side of the control panel section 8 is made approximately planar and accommodates the control panel 10 which includes a plurality of control buttons 9 in the form of push buttons to be actuated by hand. In the embodiment drawn, the control buttons 9 are mechanical switches; however, it is understood that the control buttons 9 can also be actuable in accordance with other working principles; they can in particular be part of a touch screen. In a manner known per se, the control panel section 8 can furthermore include a money input and/or output unit 11 which can be made in different manners in a manner known per se and can, for example, also include, in addition to a coin and banknote module, a token and/or ticket module or an electronic card reader and writer so that the gaming machine can be coin-operated and operated by monetary equivalents.

The games displayed on the screens 3 and 4 are controlled by an electronic control device 12, preferably in the form of a computer having at least one CPU which is accommodated in the interior of the machine housing 1, in its lower half. The control device 13 in this respect, on the one hand, controls the display apparatus 2 and, on the other hand, communicates with the control buttons 9 of the control panel 10 as well as with the money input and/or output unit 11.

As FIG. 3 shows, one or more graphic controllers 13 which communicate(s) with the two screens 3 and 4 and control(s) them is/are disposed downstream of the actual control device 12.

In the embodiment drawn in the Figures, respective different games can be displayed on the two screens 3 and 4, said games being able to be run by the control unit 12 simultaneously, with time offset and/or after one another, with, in the drawn embodiment in accordance with FIG. 1, a reel game being shown on the lower screen 4, whereas on the upper screen 3 a darts game is shown as well as additional information in an additional or pop-up window 14, said information being able to be superimposed automatically temporarily or permanently or being able to be called up by an information button of the control panel section 8. The games shown can run automatically and/or can be controlled by the control buttons provided in the control panel section 8 which can, for example, include control buttons to increase the stake, to stop, brake or accelerate the rotating game reels of the roll game or other control buttons to control further game functions.

In particular a switch button 15 of an input device 16 is provided in the control panel section 8 by means of which a switching device 17 can be actuated to switch the screen representations on the screens 3 and 4. If the switch button 15 is pressed, the screen representation 18, which is displayed on the lower screen 4 in accordance with a default setup, is switched to the upper screen 3, whereas simultaneously the screen representation 19 intended for the upper screen 3 is switched to the lower screen 4. The predetermined setup of the screen representations can in this respect be made differently, but be made in accordance with an advantageous embodiment of the invention such that a main game—in the drawn embodiment the reel game—is shown on the main screen—in the drawn embodiment the lower screen 4—whereas a secondary game—in the drawn embodiment the darts game—and, optionally, additional information being shown on a secondary screen—in the drawn embodiment the upper screen 3. This default setup can be reversed by actuating the switching device 17.

Advantageously, the named switching procedure can be displayed by an indication apparatus 20 in addition to the visually detectable switching of the screen representations, with a visual and acoustic indication apparatus 20 being provided in the drawn embodiment which, on the switching of the screen representations, outputs a flashing light, on the one hand, and a preset tone sequence, on the other hand, as soon as the screen representations are switched.

As can be recognized from FIG. 3, the switching of the screen representations can be effected on different levels of the machine control. The switching device 17 can be realized in a technical software manner and can manipulate the component executing the machine software, in particular the central control part of the control unit 12, in a technical software manner and/or manipulate the data or data contents used in this respect to effect the changed screen displays. This is symbolized by the arrow 21 in FIG. 3. In a particularly advantageous further development of the invention, the switching device 17 can also include manipulation means 22 for the electronic manipulation of the graphic controller 13 or of the optionally provided plurality of graphic controllers 13 by which the signal paths and/or memory addresses preset in the graphic controller 13 are swapped or are swapped cyclically. Alternatively, the switching device 17 can also have a signal gate in the form of a switch board which is connected between the graphic controller 13 and the two screens 3 and 4 in the signal paths and which swaps the signals of the graphic controller to the two screens 3 and 4 in dependence on the gate position.

The switching device 17 and/or the input device 16 can advantageously be actuated in different operating modes. Provision is made in this respect in the drawn embodiment that the total screen representation 18 of the lower screen 4 is switched to the upper screen 3 and the total screen representation 19 of the upper screen 3 is switched to the lower screen 4 by a single actuation of the switch button 15. FIG. 2 shows the result of this complete switching procedure in which the aforesaid additional window 14 has also been switched to the other screen.

Advantageously, however, also only a part of the screen representations can be switched to the next screen. The additional window 14 only filling the screen areas in part can in particular be switched from the upper screen 3 to the lower screen 4 and vice versa by multiple clicking of the switch button 15 and/or by actuation of the switch button 15 together with a further control button in the manner of a double click of a computer mouse. The additional window 14 can in this respect per se be fetched to initially the upper screen 3 by a separate information button. Alternatively or additionally, the switch button 15 can also be occupied to the extent that, on the first double click, the additional window 14 is fetched to the upper screen 3 and with the second double click is then fetched to the lower screen 4 and with further double click actuations is then switched back again to the upper screen 3 and/or is completely switched away.

By a further actuation of the switch button 15 in the respective operating mode, the screen representations 18, 19 as well as the additional window 14 can again be switched back to the respective starting screen.

We claim:

1. An electronic gaming or gambling machine or combination thereof, comprising:
   a display apparatus for displaying at least one game, wherein the display apparatus has at least a first and a second screen on which at least one first screen representation comprising a main game, and one second screen representation comprising at least one of a bonus game and additional information, can be displayed, and wherein the first screen is located in a first cutout of a housing, and wherein the second screen is located in a second cutout of the housing;
- a control panel for the actuation of at least one of the gaming and gambling machine;
- an input device comprising an actuation button, wherein the actuation button comprises at least one of a push button and a touch screen button; and
- a switching device actuatable by a machine user by the input device for a switching of the first screen representation from the first screen to the second screen or to a further screen or vice versa and of the second screen representation from the second screen to the first screen or to a further screen or vice versa;
- wherein the actuation button is configured to actuate the switching device by at least one of actuating and touching the button; and
- wherein said switching device is configured to be actuatable by a machine user independently from the course of a game and from the control of the game and is made such that the screen representations can be switched to and from the first and second screens during an ongoing game; and
- wherein the switching device is configured to replace the entire screen display of the first screen with the entire screen display of the second or a further screen and replace the entire screen display of the second display with the entire screen display of the first or a further screen; and
- wherein the input device has different actuation modes for the actuation of the switching device in at least one of different switching directions and in different switching modes; and
- wherein the input device is made such that an actuation of the input device in a first actuation mode triggers a switching of the switching device in at least one of a first switching direction and a switching of a first predetermined portion of the screen displays and an actuation of the input device in a second actuation mode triggers a switching in a second switching direction differing from at least one of the first switching direction and of a second predetermined portion of the screen displays.

2. The gaming or gambling machine of claim 1, wherein the display apparatus includes three or more screens and the first and second screen representations can be switched to and fro between the three or more screens by the switching device.

3. The gaming or gambling machine of claim 1, wherein the switching device is made such that the first and second screen representations can be switched to and fro between the first and second screens during an ongoing game and a representation of the ongoing game on at least one of the first and second screens.

4. The gaming or gambling machine of claim 3, wherein the switching device works without interrupting the game.

5. The gaming or gambling machine of claim 1, wherein a switch control is provided for the automatic actuation of the switching device dependent on a preset operating condition of the gaming or gambling machine.

6. The gaming or gambling machine of claim 5, wherein the switch control works in dependence on a course of a game shown on one of the first and second screens, wherein the course of the game comprises an occurrence of at least one of a predetermined game situation and game condition comprising at least one of an input request, a game result and an end phase of at least one of a game and a restart of the game.

7. The gaming or gambling machine of claim 1, wherein the input device has a movement sensor for the detection of a movement of a part of the body, in particular a hand movement, for the actuation of the switching device by hand movement.

8. The gaining or gambling machine of claim 1, wherein the input device has an acoustic input for the actuation of the switching device by at least one of voice and sound.

9. The gaming or gambling machine of claim 1, wherein the first actuation mode can be triggered by a simple actuation of an input means of the input device and the second actuation mode can be triggered by a multiple actuation of the named input means, and wherein the multiple actuation of the named input means comprises a double click.

10. The gaming or gambling machine of claim 1, wherein the first actuation mode can be triggered by actuation of a first input means of the input device and the second actuation mode can be triggered by actuation of a second input means of the input device.

11. The gaming or gambling machine of claim 10, wherein the second actuation mode can be triggered by actuation of the first input means together with the second input means, in particular by pressing a button combination.

12. The gaming or gambling machine of claim 1, wherein the switching device has a manipulator for the manipulation of at least one graphic controller by which the first and second screens can be controlled.

13. The gaming or gambling machine of claim 1, wherein the switching device has a program controller for the change of the control program executed in at least one central control unit in a technical software manner, said control program controlling the screen display in a technical software manner.

14. The gaming or gambling machine of claim 1, wherein the switching device has a switchable signal gate comprising a switch board, in a signal path or a plurality of signal paths between one or more graphic controllers and the first and second screens controlled thereby.

15. The gaming or gambling machine of claim 1, wherein machine is configured to at least one of switch the first screen display to a total screen area of the first screen, and switch the second screen display to a total screen area of the second screen.

16. The gaming or gambling machine of claim 1, wherein the gaming or gambling machine is a slot machine which is coin operable or is operable by monetary equivalents.

17. An electronic gaming or gambling machine or combination thereof, comprising:
- a display apparatus for displaying at least one game, wherein the display apparatus has at least a first and a second screen on which at least one first screen representation comprising a main game, and one second screen representation comprising at least one of a bonus game and additional information, can be displayed, and wherein the first screen is tilted at an obtuse angle to the second screen;
- a control panel for the actuation of at least one of the gaming and gambling machine;
- an input device comprising an actuation button, wherein the actuation button comprises at least one of a push button and a touch screen button;
- a switching device actuatable by a machine user by the input device for a switching of the first screen representation from the first screen to the second screen or to a further screen or vice versa and of the second screen representation from the second screen to the first screen or to a further screen or vice versa; and an indication apparatus controllable by the switching device, and wherein the indication apparatus is acoustically controllable, and wherein the indication apparatus is configured to produce indication signals indicating a switching procedure of the first and second screen representations, and wherein the indication signals are in addition to a visual image of the first and second screens; and wherein the actuation button is configured to actuate the switching device by at least one of actuating and touching the button; and wherein said switching device is configured to be actuatable by a machine user independently from the course of a game and from the control of the game and is made such that the screen representations can be switched to and from the first and second screens during an ongoing game; and wherein the switching device is configured to replace the entire screen display of the first screen with the entire screen display of the second or a further screen and replace the entire screen display of the second display with the entire screen display of the first or a further screen.

18. The gaming or gambling machine of claim 17, wherein the indication device outputs different indication signals for different switching procedures, wherein each indication signal correspond to each switching process.

19. The gaming or gambling machine of claim 17, wherein the indication signals of the indication apparatus include acoustic signals having tone levels, and wherein the acoustic signals vary in tone levels.

* * * * *